United States Patent
Hafeez (10) Patent No.: US 8,265,213 B2
(45) Date of Patent: Sep. 11, 2012

(54) METHOD AND APPARATUS FOR CANCELLATION OF PARTIALLY KNOWN INTERFERENCE USING TRANSMIT DIVERSITY BASED INTERFERENCE CANCELLATION

(75) Inventor: Abdulrauf Hafeez, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/158,936

(22) Filed: Jun. 13, 2011

(65) Prior Publication Data

US 2011/0235736 A1 Sep. 29, 2011

Related U.S. Application Data

(62) Division of application No. 11/733,333, filed on Apr. 10, 2007, now Pat. No. 8,000,419.

(51) Int. Cl.
*H04B 7/10* (2006.01)
*H04L 1/02* (2006.01)

(52) U.S. Cl. ....... 375/347; 375/316

(58) Field of Classification Search ........ 375/347, 375/346, 316
See application file for complete search history.

(56) References Cited

U.S. PATENT DOCUMENTS

2005/0135517 A1 * 6/2005 Coffey et al. .......... 375/347
2005/0195769 A1 * 9/2005 Kaewell et al. ....... 370/335

* cited by examiner

*Primary Examiner* — David C. Payne
*Assistant Examiner* — Brian J Stevens
(74) *Attorney, Agent, or Firm* — Coats & Bennett, P.L.L.C.

(57) ABSTRACT

In wireless communication networks, potentially significant interference arises at a given targeted receiver because of unrelated transmissions from a neighboring, interfering transmitter. According to apparatuses and methods described and claimed herein, a first transmitter provides for cancellation of partially known interference at a targeted receiver by employing a transmit diversity based interference cancellation method, wherein it transmits diversity combinations of desired and interfering symbols. Correspondingly, the targeted receiver employs diversity combining of the received signals to cancel interference attributable to the interfering symbols.

8 Claims, 6 Drawing Sheets

METHOD AND APPARATUS FOR CANCELLATION OF PARTIALLY KNOWN INTERFERENCE USING TRANSMIT DIVERSITY BASED INTERFERENCE CANCELLATION

RELATED APPLICATIONS

This application is a divisional of application Ser. No. 11/733,333 filed Apr. 10, 2007.

BACKGROUND

1. Technical Field

The present invention generally relates to communication systems, such as cellular communication networks, and particularly relates to a method and apparatus for canceling partially known interference using transmit diversity based interference cancellation (TDIC).

2. Background

Wireless communication networks commonly employ spatial reuse for improved network capacity. With spatial reuse, geographically separate transmitters reuse the same channelization resources (i.e., spreading codes, frequencies, and or times) to transmit different information to different users. Not uncommonly, the receiver targeted by one transmitter moves into a service area where another transmitter interferes with it. That is, the targeted receiver's reception of desired symbols from a first transmitter is interfered with by its reception of interfering symbols from a nearby or adjacent second transmitter.

Such scenarios arise, for example, in relay-based communication systems wherein a first transmitter transmits directly to a first targeted receiver and relays transmit information for a second targeted receiver to a given relay station. In turn, that relay station transmits the relayed transmit information to the second targeted receiver. Depending upon geography and the location of the first targeted receiver, transmissions from the relay station may significantly interfere with its reception of desired information from the first transmitter. Of course, the same or similar interference scenarios can arise in non-relay communication networks, as well.

One mechanism to combat such interference involves strategic scheduling of transmission times across or between potentially interfering transmitters. However, doing so obviously adds to network complexity because of the need for increased coordination between the transmitters. Such operation also reduces the spectral efficiency of the network, as some transmitters forego transmission to one or more of their supported receivers at strategic times.

SUMMARY

In wireless communication networks, potentially significant interference arises at a given targeted receiver because of unrelated transmissions from a neighboring, interfering transmitter. According to the teachings described and claimed herein, a first transmitter cancels partially known interference at a targeted receiver using a transmit diversity based interference cancellation method that needs only knowledge of the interfering transmit signal and knowledge of a ratio of the respective channel gains between the first transmitter and the targeted receiver and between the interfering transmitter and the targeted receiver. By not requiring knowledge of the phase of the interfering channel, the transmit diversity based interference cancellation method is less sensitive to channel estimation errors, and requires less feedback.

Thus, where a first transmitter transmits desired symbols to a targeted receiver and a second transmitter transmits known interfering symbols, one embodiment of a method of transmit diversity based interference cancellation at the first transmitter comprises receiving scaling information at the first transmitter relating to the targeted receiver. Where the second transmitter respectively transmits first and second interfering symbols in first and second symbol periods or first and second sub-carrier frequencies, the method further includes transmitting from the first transmitter in the first symbol period or sub-carrier frequency a first transmit diversity combination of a first desired symbol and the second interfering symbol, and transmitting from the first transmitter in the second symbol period or sub-carrier frequency a second transmit diversity combination of the first desired symbol and the first interfering symbol.

In support of these transmit diversity combination transmissions, the first transmitter forms the first transmit diversity combination as the first desired symbol and the conjugate of the second interfering symbol, where both such symbols are scaled according to the scaling information. Similarly, the first transmitter forms the second transmit diversity combination as the conjugate of the first desired symbol and the conjugate of the first interfering symbol scaled according to the scaling information. Those skilled in the art will appreciate that this and other embodiments of transmit diversity based interference cancellation as taught herein can be implemented at the first transmitter, e.g., a wireless communication network base station, by including one or more processors configured to carry out transmit diversity based interference cancellation.

Complementing the above and other embodiments of transmit diversity based interference cancellation as taught herein, one or more embodiments of the targeted receiver include one or more processors configured to perform diversity combining for canceling the effects of the interfering symbols from the desired symbols. In one embodiment, the receiver processor(s) implements a method of supporting transmit diversity based interference cancellation that includes determining a linear filter as a function of first and second channel models and, in one or more embodiments, noise variance. The first and second channel models relate the targeted receiver to first and second transmitters, respectively, where the first transmitter transmits a transmit diversity combination signal to the receiver having desired and interfering symbol information, and the second transmitter transmits an interfering signal having interfering symbol information. The method further includes detecting desired symbol information by applying the filter to a received signal formed as first and second received signals.

In this context, the first received signal corresponds to a first symbol period or sub-carrier wherein the first transmitter transmitted a first transmit diversity combination signal formed from a first desired symbol and a second interfering symbol, and the second transmitter transmitted a first interfering symbol. Likewise, the second received signal corresponds to a second symbol period or sub-carrier wherein the first transmitter transmitted a second transmit diversity combination signal formed from the first desired symbol and the first interfering symbol, and the second transmitter transmitted the second interfering symbol.

In one or more embodiments, the transmit diversity based interference cancellation method employs "precoding" to increase channel capacity on the communication link(s) subject to transmit diversity based interference cancellation. With precoding, the transmit diversity based interference cancellation method further includes determining a complex precoding value and adding the precoded value to each of the first and second transmit diversity combinations transmitted as described above, and the targeted receiver is correspondingly configured to estimate the precoding value as part of its diversity-combining based symbol detection.

Additionally, in any of the above or other embodiments, transmit diversity based interference cancellation as taught herein can be practiced on a selective basis, responsive to changing reception conditions at the targeted receiver. That is, under some reception conditions and interference scenarios, transmit diversity based interference cancellation might or might not offer better performance as compared to operation without transmit diversity based interference cancellation. In one embodiment, the targeted receiver determines a reception performance metric in a first case that assumes transmit diversity based interference cancellation is active, and in a second case that assumes transmit diversity based interference cancellation is inactive. With this basis, the supporting transmitter can selectively operate with transmit diversity based interference cancellation and without transmit diversity based interference cancellation, responsive to the indication of whether reception performance is estimated to be better with or without it.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
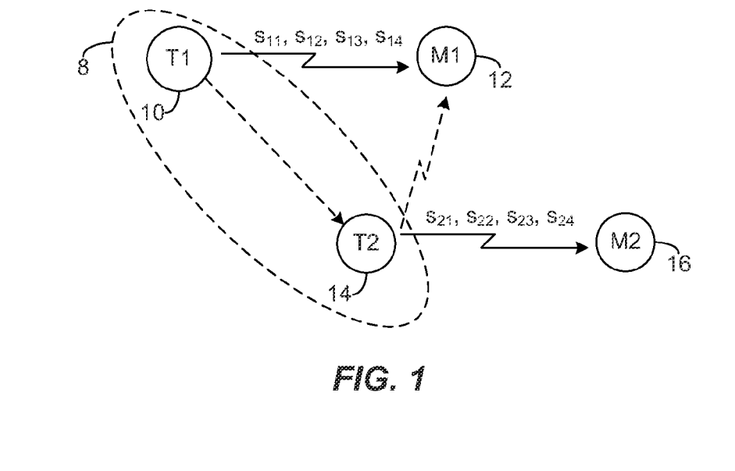
FIG. 1 is a partial block diagram of one embodiment of a wireless communication network wherein at least one transmitter and corresponding targeted receiver are configured for transmit diversity based interference cancellation as taught herein.

As a non-limiting example to aid discussion, FIG. 1 partially illustrates a wireless communication network 8, which includes a first transmitter 10 (denoted as "T1") transmitting to a targeted receiver 12 (denoted as "M1"), and further includes a second transmitter 14 (denoted as "T2") also transmitting to a targeted receiver 16 (denoted as "M2"). The transmitters 10 and 14 and receivers 12 and 16 may respectively comprise radio base stations and mobile stations in a wireless communication network, such as a Wideband Code Division Multiple Access (WCDMA) network. Thus, the transmitters 10 and 14 may comprise Node B elements and/or Radio Network Controller elements in a WCDMA network, and the receivers 12 and 16 may comprise cellular radiotelephones, mobile pagers, wireless modem/network cards or modules, PDAs (portable digital assistants), or essentially any type of wireless communication system or device.

For this discussion, one may assume that at least T1 and M1 are correspondingly configured for transmission and reception according to one or more embodiments of transmit diversity based interference cancellation as taught herein. As such, transmissions from T1 to M1 represent transmit diversity combinations of the desired and interfering symbols to be conveyed from T1 to M1 and the interfering symbols to be conveyed from T2 to M2 but undesirably "overheard" by M1. In this context, then, T1 may be regarded as a first transmitter transmitting desired first symbol information to M1 as its targeted receiver (e.g., symbols $s_{11}$, $S_{12}$, $s_{13}$, and $s_{14}$), and T2 may be regarded as an interfering transmitter transmitting interfering second symbol information (e.g., symbols $s_{21}$, $s_{22}$, $s_{23}$, and $s_{24}$), where the undesired, interfering symbol information is known to T1.

That is, one may assume that T1 has knowledge of the interfering symbols being transmitted by T2. For example, T2 may be a relay node that transmits symbol information relayed to it via T1. In such instances, T1 receives symbol information for transmission to M1 and for transmission to M2. Assuming that M1 is within T1's service area, and that M2 is within T2's service area, T1 directly or indirectly relays the symbols intended for M2 to T2 for transmission to M2 by T2, and directly transmits the symbol information for M1. Equivalently, T1 directly or indirectly relays the corresponding transmit information used by T2 to generate the interfering symbols. In either case, T1 knows the symbol information being transmitted by T2 in any given symbol period or sub-carrier frequency (e.g., in OFDM applications).

Of course, T1 may gain knowledge of the interfering symbol information by other mechanisms. By way of non-limiting examples, T1 and T2 can be configured to share symbol information in advance of transmitting that information, and/ or higher-layer network controllers can inform T1 of the symbol information being transmitted by T2 (and/or other neighboring transmitters). Thus, T1 may receive interfering symbols in advance of their transmission by T2, and buffer them as needed for practicing the transmit diversity based interference cancellation method at T1. In at least one such embodiment, this comprises receiving desired and interfering packet data at T1 in advance of T2 transmitting the interfering packet data.

Figure 2:
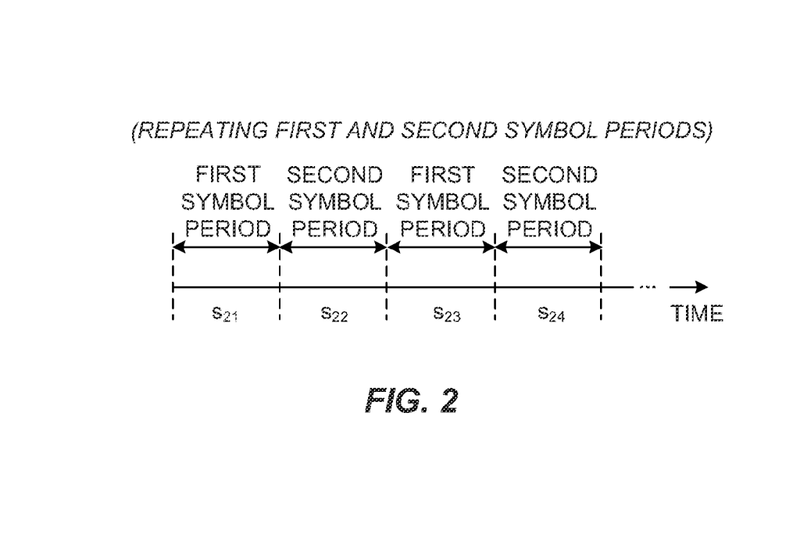
FIG. 2 is a diagram of succeeding pairs of first and second symbol times, in which transmit diversity combinations of desired and interfering symbols may be transmitted for cancellation of undesired symbol interference at a targeted receiver.
Figure 3:
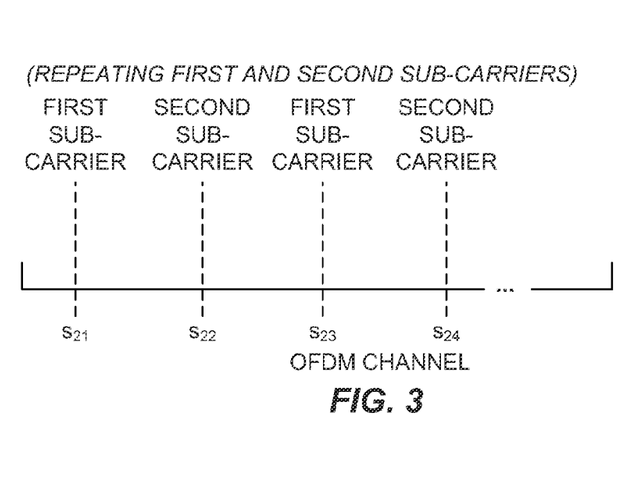
FIG. 3 is a diagram of succeeding pairs of first and second sub-carriers, such as in an OFDM channel, and in which transmit diversity combinations of desired and interfering symbols may be transmitted for cancellation of undesired symbol interference at a targeted receiver.

In any case, one may assume that T2 transmits the interfering symbols in successive symbol periods or (OFDM) sub-carriers and that the transmission of these symbols causes reception interference at M1 with respect to recovery of the desired symbols. One may conceptualize ongoing transmissions from T2 as repeating first and second symbol periods or repeating first and second sub-carriers (e.g., within a given set or sub-set of OFDM sub-carriers comprising an OFDM "channel"). FIG. 2 illustrates repeating first and second symbol periods, while FIG. 3 illustrates repeating first and second sub-carriers, such as within a set or sub-set of OFDM sub-carriers in a given OFDM "channel."

More particularly, with reference to FIG. 2, one sees that T2 transmits a first interfering symbol $s_{21}$ in a first symbol period and transmits a second interfering symbol $s_{22}$ in a corresponding second symbol period. Similarly, interfering symbols $s_{23}$ and $s_{24}$ are respectively transmitted in the next repeating first and second symbol periods. FIG. 3 illustrates the same successive transmissions of interfering symbols $s_{21}$, $s_{22}$, $s_{23}$, and $s_{24}$, but in repeating first and second sub-carrier frequencies. For simplified discussion, one may assume that any reference herein to transmit diversity based interference cancellation as applied to successive symbol periods applies equally to successive sub-carriers, unless otherwise noted. Also, one may assume that any reference herein to transmit diversity based interference cancellation as applied to successive symbol periods applies equally to non-successive symbol periods or sub-carriers over which the channel model remains the same.

To compensate for the interference caused by transmissions of interfering symbols from T2, T1 correspondingly transmits transmit diversity combinations of desired and interfering symbols over those same symbol periods or sub-carriers, such that M1 cancels the interference arising from the interfering symbols through diversity combining. That is, T1 forms transmit diversity combinations of desired symbols and interfering symbols (on an ongoing basis) such that the signal from T1 as received at M1 tends to cancel the interfering symbols at M1 as received from T2. Advantageously, T1 practices a form of transmit diversity based interference cancellation that needs only knowledge of the interfering symbols (i.e., what is being transmitted from T2 in any given time or frequency) and knowledge of a ratio of the respective channel gains between M1 and T1 and between M1 and T2.

In more detail, the targeted receiver 12 receives desired symbols from the first transmitter 10 and interfering symbols from the second transmitter 14. As such, the baseband received signal at the targeted receiver 12 is given by, $$y_n = cs'_n + di_n + w_n \qquad \text{Eq. (1)}$$

where "n" denotes a given symbol period (or sub-carrier frequency), "c" and "d" respectively denote the channel impulse responses from the first transmitter 10 and the second transmitter 14 to the targeted receiver 12, $s'_n$ denotes a transmit diversity combination of a desired symbol and an interfering symbol as transmitted from the first transmitter 10, $i_n$ denotes the interfering symbol transmitted by the second transmitter 14 in the same symbol period or sub-carrier frequency, and $w_n$ denotes a noise term (e.g., background/thermal noise) that may be used to account for everything except the reception interference arising from the known, interfering symbol $i_n$.

Figure 4:
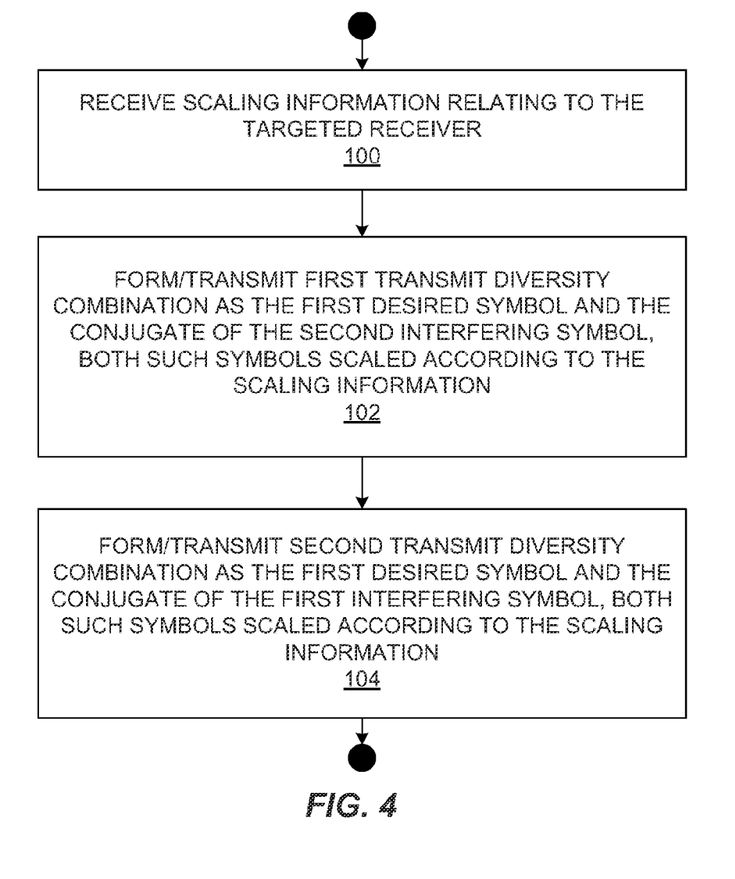
FIG. 4 is a logic flow diagram for one embodiment of transmit diversity based interference cancellation at a transmitter.

Thus, one aspect of transmit diversity based interference cancellation as taught herein relates to implementing the first transmitter 10 with one or more processors that are configured to form $s'_n$ as the proper transmit diversity combination for the n-th given symbol period or sub-carrier. FIG. 4 broadly illustrates one embodiment of the transmit diversity based interference cancellation method taught herein, and it should be understood that such processing may be implemented in hardware, software, or any combination thereof. In at least one embodiment, the first transmitter 10 includes one or more processors (e.g., special or general purpose microprocessors, digital signal processors, ASICs, FPGAs, or other digital processing logic) executing computer program instructions embodied in a computer-readable medium, where those instructions comprise one or more embodiments of the transmit diversity based interference cancellation method taught herein.

Further with respect to FIG. 4, it should be understood that the illustrated processing connotes serial, sequential processing, but that should be understood as a non-limiting example for discussion. One or more processing steps may be performed concurrently (where possible), and one or more processing steps may be performed on an ongoing basis, such as in a background or supporting processes, such that at least some aspects of the illustrated processing are done in parallel. Finally, it should be noted that some or all of the processing steps may be repeated or looped as desired, and may be performed as part of a larger set of ongoing communication processes.

With the above caveats and qualifications in mind, the illustrated processing of FIG. 4 "begins" with the first transmitter 10 receiving scaling information relating to the targeted receiver 12, such as feedback comprising or based on first and second channel models relating the targeted receiver 12 to the first and second transmitters 10 and 14, respectively (Step 100). For example, in some embodiments, the targeted receiver determines first and second channel models, e.g., first and second channel gains respectively relating the targeted receiver to the first and second transmitters 10 and 14, and sends the channel model information back as scaling information from which the first transmitter 10 determines scaling values to be used in scaling the desired and interfering symbols transmitted by it in the form of transmit diversity combinations. In other embodiments, the targeted receiver 12 computes the appropriate scaling values and sends the scaling values back as the scaling information to be used at the first transmitter 10.

In any case, in the above context, the second transmitter 14 respectively transmits first and second interfering symbols in first and second symbol periods or first and second sub-carrier frequencies. For example, the transmitter 14 transmits $s_{21}$ and $s_{22}$ in a pair of first and second symbol periods (as shown in FIG. 3).

For the first symbol period, processing at the first transmitter 10 continues with forming/transmitting a first transmit diversity combination of a first desired symbol ($s_{11}$) and the second interfering symbol ($s_{22}$) (Step 102). For the successive second symbol period, processing continues with the first transmitter 10 forming/transmitting a second transmit diversity combination of the first desired symbol ($s_{11}$) and the first interfering symbol ($s_{21}$) (Step 104). As with the first transmit diversity combination, the desired and interfering symbols of the second transmit diversity combination are scaled according to the scaling information.

These repeating pairs of first and second symbol periods may be thought of as even and odd pairs of symbol periods (or, likewise, even and odd pairs of sub-carriers within a given set or subset of OFDM sub-carriers). Thus, in an even symbol period, the first transmitter 10 transmits a combination of a desired symbol and the interfering symbol from the corresponding odd symbol period. In that corresponding odd symbol period, the first transmitter 10 transmits a combination of the same desired symbol and the interfering symbol from the even symbol period.

In other words, at first (odd) times, the transmit diversity combination includes a combination of the desired symbol and the even period interfering symbol, while at second (even) times, the transmit diversity combination includes a combination of the desired symbol and the odd period interfering symbol. As a general proposition, the first transmitter 10 performs ongoing transmit diversity based interference cancellation by forming subsequent first and second transmit diversity combinations for any number of subsequent first desired symbols and corresponding subsequent pairs of first and second interfering symbols, and transmitting the subsequent first and second transmit diversity combinations in continuation of the transmit diversity method at the first transmitter. Thus, the first/second symbol period (sub-carrier) transmissions can be carried on as needed.

With this approach, those skilled in the art will appreciate that the targeted receiver 12 is configured to perform diversity combining of the signals received in first (odd) and second (even) symbol periods, to cancel interference with respect to the first and second interfering symbols. Such operation means that the symbol rate between the first transmitter 10 and the targeted receiver 12 is one-half that of the rate between the second transmitter 14 and its targeted receiver 16, but reception at the targeted receiver 12 is substantially free of the interference caused by transmissions from the second transmitter 14.

Figure 5:
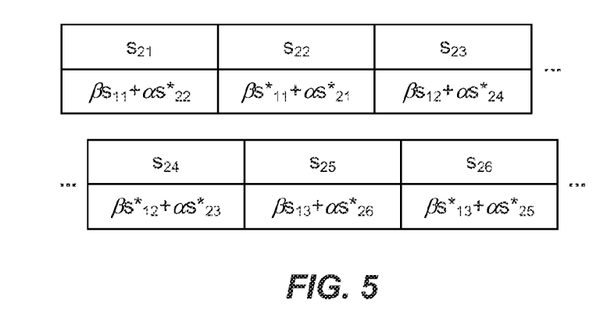
FIG. 5 is a diagram of corresponding transmit diversity combinations transmitted from that transmitter in succeeding pairs of first and second symbol times or sub-carriers.

In more detail, assuming that the first transmitter 10 is to transmit desired symbols $s_{11}$, $s_{12}$, $s_{13}$, and $s_{14}$, and that the second transmitter 14 is to transmit interfering symbols $s_{21}$, $s_{22}$, $s_{23}$, and $s_{24}$, FIG. 5 illustrates the transmission of interfering symbols by the second transmitter 14 in successive symbol periods, and the corresponding transmit diversity combinations formed and transmitted by the first transmitter 10 in those same symbol periods.

In the same period that the second transmitter 14 transmits $s_{21}$, the first transmitter 10 transmits a first transmit diversity combination signal comprising $$s'_1 = \beta s_{11} - \alpha s^*_{22} \qquad \text{Eq. (2)}$$

Similarly, when the second transmitter 14 transmits $s_{22}$, the first transmitter 10 transmits a second transmit diversity combination signal comprising $$s'_2 = \beta s^*_{11} - \alpha s^*_{21} \qquad \text{Eq. (3)}$$

Those skilled in the art will appreciate that the transmitter 10 forms the first transmit diversity combination as the first desired symbol ($s_{11}$) scaled by scaling value $\beta$ and the conjugate of the second interfering symbol ($s^*_{22}$) scaled by scaling value $\alpha$, where the scaling values in one embodiment relate to channel models, such as the ratio of the first and second channel gains relating the targeted receiver 12 to the first and second transmitters 10 and 14. Correspondingly, the transmitter 10 forms the second transmit diversity combination as the conjugate of the first desired symbol ($s^*_{11}$) scaled by scaling value $\beta$ and the conjugate of the first interfering symbol ($s^*_{21}$) scaled by scaling value $\alpha$. Similarly, when the second transmitter 14 respectively transmits $s_{23}$ and $s_{24}$ in a successive pair of first and second symbol periods, the first transmitter 10 respectively transmits $\beta s_{12} - \alpha s^*_{24}$ and $\beta s^*_{12} \alpha s^*_{23}$.

More generically, for any interfering symbols $i_1$ and $i_2$ to be transmitted from the second transmitter 14 during first and second symbol periods, the first transmitter 10 forms first and second transmit diversity combinations for a desired symbol s as, $$s'_1 = \beta s - \alpha i^*_2 \qquad \text{Eq. (4)}$$

and $$s'_2 = \beta s^* - \alpha i^*_1 \qquad \text{Eq. (5)}$$

Accordingly, at the targeted receiver 12, the received signals for the first and second symbol periods may be expressed as, $$\underline{y} = \begin{bmatrix} y_1 \\ y^*_2 \end{bmatrix} = \begin{bmatrix} c \\ c^* \end{bmatrix} \beta s + \begin{bmatrix} d & -\alpha c \\ -\alpha c^* & d^* \end{bmatrix} \begin{bmatrix} i_1 \\ i^*_2 \end{bmatrix} + \begin{bmatrix} w_1 \\ w^*_2 \end{bmatrix} \qquad \text{Eq. (6)}$$

Figure 6:
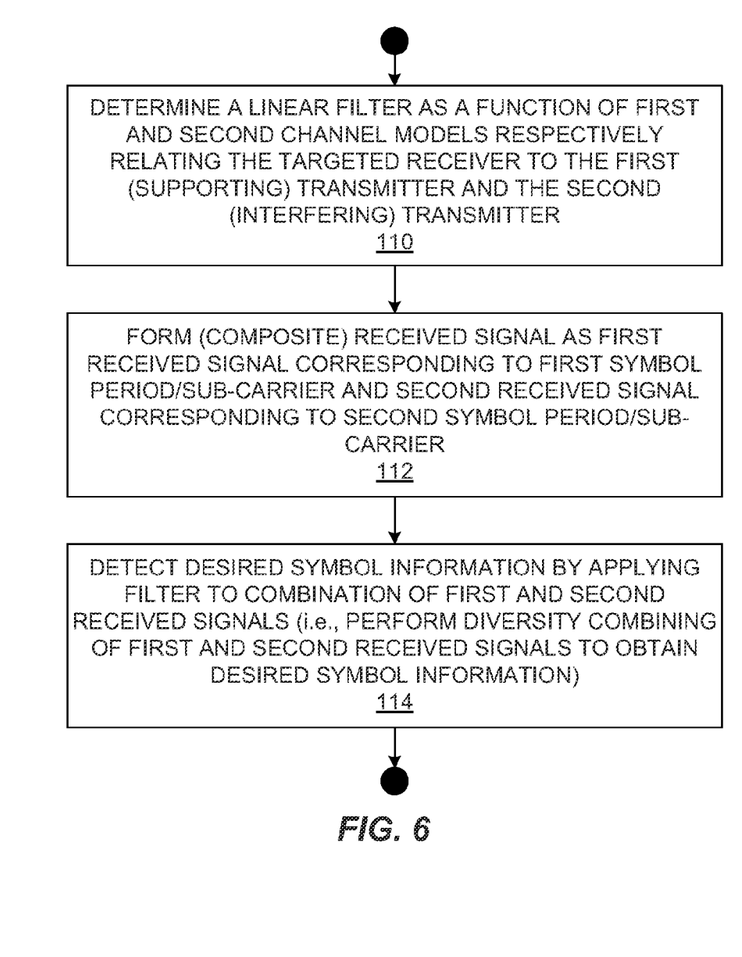
FIG. 6 is a logic flow diagram for one embodiment of transmit diversity combining at a targeted receiver, complementing transmit diversity based interference cancellation at a supporting transmitter.

By defining $\alpha$ to be the inverse square-root of the instantaneous signal-to-interference ratio (SIR) at the targeted receiver 12, i.e., $$\alpha = \sqrt{\frac{|d|^2}{|c|^2}} \qquad \text{Eq. (7)}$$

the interference matrix of Eq. (6) becomes rank deficient. That is, the determinant of the matrix $$\begin{bmatrix} d & -\alpha c \\ -\alpha c^* & d^* \end{bmatrix} \qquad \text{Eq. (8)}$$

equals zero. In other words, interference can be completely cancelled at the receiver. For $\alpha<1$, one can set $\beta=\sqrt{1-\alpha^2}$ so that the total transmit power is constrained to "1." The targeted receiver 12 can be configured to obtain the desired symbol(s) by carrying out the processing of FIG. 6, or by carrying out variations of that processing. As with the processing logic of FIG. 4, FIG. 6 does not necessarily connote sequential processing; some of the illustrated processing can be carried out in parallel or as part of background processing. Moreover, the processing of FIG. 6 can be repeated or looped as needed, and may be carried out as part of a larger or more sophisticated set of receiver processing operations.

In any case, the illustrated processing begins with targeted receiver 12 determining a filter as a function of first and second channel models (Step 110), which it may determine by estimating channel gains, etc. Note that, in at least one embodiment, the targeted receiver further bases its determination of the filter on noise variance. Note, too, that such processing may be used in determining scaling information for sending to the first transmitter 10, for its use applying scaling values to the desired and interfering symbols included in the transmit diversity combinations being transmitted by the first transmitter 10. That is, the targeted receiver 12 may determine the scaling information for feedback to the first transmitter 10 as a function of the first and second channel models as estimated by the targeted receiver 12. Thus, it will be understood that the targeted receiver 12 may, as part of its processing, send scaling information to the first transmitter 10 on an ongoing basis, such as periodically, such that the scaling information used by the first transmitter 10 to form its transmit diversity combinations updates to reflect changing reception conditions at the targeted receiver 12.

Processing continues with the targeted receiver 12 forming its (composite) received signal as a first received signal corresponding to a first symbol period (or sub-carrier) and a second received signal corresponding to a corresponding second symbol period (or sub-carrier) (Step 112). With this received signal formulation, the targeted receiver 12 detects the desired symbol information by applying the matched filter to a combination of the first and second received signals (Step 114), i.e., the targeted receiver 12 is configured to perform diversity combining of the first and second received signals to obtain the desired symbol information substantially free of interference associated with receipt of the interfering symbols at the targeted receiver 12.

In more detail, in at least one embodiment, the targeted receiver 12 is configured to filter the received (first and second) signals as $$z = \underline{f}^H \underline{y} \qquad \text{Eq. (9)}$$

where $\underline{f}$ is a two-tap filter given by $$\underline{f} = \frac{c + d/\alpha}{2|c|^2 \beta (1 + \cos\theta)} \begin{bmatrix} 1 \\ \alpha c^*/d \end{bmatrix} \qquad \text{Eq. (10)}$$

where $\theta = \arg\{c\} - \arg\{d\}$ represents the phase difference between the channel impulse response coefficient of the channel between the targeted receiver 12 and the first transmitter 10 and the channel impulse response coefficient of the channel between the targeted receiver 12 and the second transmitter 14. The filtered signal is given by $$z = s + u \qquad \text{Eq. (11)}$$

where u is filtered noise with variance $$\sigma_u^2 = \frac{N_0}{(|c|^2 - |d|^2)(1 + \cos\theta)} \qquad \text{Eq. (12)}$$

and where $N_o$ is the power spectral density of the noise. Those skilled in the art will immediately appreciate that the received signal formulation is free of interference from the interfering symbols $i_1$ and $i_2$ shown in Eq. (6). In other words, the determination and application of the above filtering cancels interference at the targeted receiver 12 that is attributable to its reception of interfering symbols from the second transmitter 14.

After filtering, a simple thresholding detector at the targeted receiver 12 can be used to detect the desired symbol s. For detection of that desired symbol at the targeted receiver 12, the SNR (signal-to-noise ratio) is given as $$SNR = \frac{(|c|^2 - |d|^2)(1 + \cos\theta)}{N_0} \qquad \text{Eq. (13)}$$

Notably, the formulation of transmit diversity combinations at the first transmitter 10 is independent of channel phase information, meaning that less channel feedback is required and that such transmit diversity based interference cancellation as taught herein is not sensitive to errors that might otherwise arise if channel phase estimation was required. However, it will be appreciated that the effectiveness of transmit diversity based interference cancellation as taught herein does depend on the instantaneous phase difference between the desired and interfering channels c and d. In instances where the phases are aligned, transmit diversity combining cancels desired symbol information, but such instances rarely will arise in actual operation, given uncorrelated fading between the desired and interfering channels.

Assuming uncorrelated fading, the average SNR is given as $$SNR_{av} = \frac{|c|^2 - |d|^2}{N^0} \qquad \text{Eq. (14)}$$

Assuming that transmit diversity based interference cancellation is active, and with the formulation of Eq. (13), it can be shown that the channel capacity of the channel between the first transmitter 10 and the targeted receiver 12 is given by $$\text{Capacity} = \frac{1}{2} \log_2 \left( 1 + \frac{\max\{(|c|^2 - |d|^2)(1 + \cos\theta), 0\}}{N_o} \right) \qquad \text{Eq. (15)}$$

The factor of ½ arises in Eq. (15) because the transmitter 10 transmits desired symbols to the targeted transmitter 12 at one-half the rate at which interfering symbols are transmitted.

Of further interest, the difference term in the numerator of Eq. (15) arises because a fraction of the transmit power from the transmitter 10 is used for interfering symbol transmission, rather than being wholly allocated for desired symbol transmission.

In a normalizing simplification, the transmit power can be assumed to be one for both the first and second transmitters 10 and 14. Alternatively, the respective transmit powers can be assumed to be included in the corresponding channel powers. In any case, the capacity formulation of Eq. (15) implies that error-free communication between the first transmitter 10 and the targeted receiver 12 is possible only if the instantaneous SIR is greater than 0 dB. In a system with equal transmit powers for the first transmitter 10 and the second transmitter 14, this implication means that the channel gain c of the first transmitter 10 must be higher than the channel gain d of the second transmitter 14.

Thus, one or more embodiments of transmit diversity based interference cancellation at the first transmitter 10 and complementary transmit diversity reception at the targeted receiver 12 consider alterations tending to yield improvements in channel capacity. In one such embodiment, the transmitter 10 is additionally configured to employ precoding to reduce the amount of power used for transmitting the interfering symbols. This enables the transmitter to allocate more power for the desired symbols relative to a fixed total power.

In more detail, and with reference back to Eq. (4) and Eq. (5), for M-PAM (pulse amplitude modulation) or $M^2$-QAM (quadrature amplitude modulation) with $\delta$ as the smallest distance between any pair of symbols in the desired symbol modulation alphabet, the first transmitter 10 transmits in the first symbol period a transmit diversity combination given as, $$s'_1 = \beta' s - \alpha i^*_2 - \beta' x \qquad \text{Eq. (16)}$$

and transmits in the second symbol period a transmit diversity combination given as, $$s'_2 = \beta' s^* - \alpha i^*_1 - \beta' x^* \qquad \text{Eq. (17)}$$

In the formulations given in Eq. (16) and Eq. (17), $\beta' = \sqrt{1-\alpha^2/2}$ and the term "x" represent a complex precoding value given by $$x = x_I + x_Q \qquad \text{Eq. (18)}$$

The in-phase (I) and quadrature (Q) components of the complex value of x are respectively given as, $$x_I = \text{round}\left(\frac{\text{Re}(\beta's - \frac{\alpha}{2}i_2^* - \frac{\alpha}{2}i_1)}{M\delta\beta'}\right) \times M\delta \qquad \text{Eq. (19)}$$

and $$x_Q = \text{round}\left(\frac{\text{Im}(\beta's - \frac{\alpha}{2}i_2^* - \frac{\alpha}{2}i_1)}{M\delta\beta'}\right) \times M\delta \qquad \text{Eq. (20)}$$

In Eq. (19) and Eq. (20), "round" refers to rounding to the nearest integer and "Re" and "Im" refer to the real and imaginary parts of a complex number, respectively.

With precoding as described above, the received signals for the first and second symbol periods can be expressed as, $$\underline{y}' = \begin{bmatrix} c \\ c^* \end{bmatrix}\beta'(s-x) + \begin{bmatrix} d & -\alpha c \\ -\alpha c^* & d^* \end{bmatrix}\begin{bmatrix} i_1 \\ i_2^* \end{bmatrix} + \begin{bmatrix} w_1 \\ w_2^* \end{bmatrix} \qquad \text{Eq. (21)}$$

Correspondingly, the targeted receiver 12 can be configured to filter these received signals for transmit diversity combining as, $$z' = \underline{f}'^H \underline{y}' = s - x + u' \qquad \text{Eq. (22)}$$

where $$\underline{f}' = \frac{c + d/\alpha}{2|c|^2\beta'(1+\cos\theta)}\begin{bmatrix} 1 \\ \alpha c^*/d \end{bmatrix} \qquad \text{Eq. (23)}$$

In at least one embodiment, the targeted receiver 12 includes one or more processors supporting diversity combining, and these one or more processors are configured to perform a "blind" detection of the precoding value x as $$\hat{x} = \hat{x}_I + \hat{x}_Q \qquad \text{Eq. (24)}$$

where $$\hat{x}_I = -\text{round}\left(\frac{\text{Re}(z')}{M\delta}\right) \times M\delta \qquad \text{Eq. (25)}$$

and $$\hat{x}_Q = -\text{round}\left(\frac{\text{Im}(z')}{M\delta}\right) \times M\delta \qquad \text{Eq. (26)}$$

With Eq. (22) in mind, the targeted receiver 12 can subtract off the term involving x from its filtered output as $$\hat{z} = z' + \hat{x} \qquad \text{Eq. (27)}$$

The detection statistic given by Eq. (27) can be used by the targeted receiver 12 to detect the desired symbol s. If the in-phase and quadrature components of the filtered noise u' are smaller than $M\delta$, then one sees from Eq. (24), Eq. (25), and Eq. (26) that x is detected correctly and therefore its addition to the transmit diversity combinations being transmitted by the first transmitter 10 has no impact on the detection of desired symbols at the targeted receiver 12. On the other hand, if either the in-phase or the quadrature noise component is greater than $M\delta$, then the targeted receiver 12 may incorrectly detect x and therefore incorrectly detect the desired symbol s. However, with that much noise, it is likely that the targeted receiver 12 would not correctly detect the desired symbol s even with the basic scheme embodied in Eq. (11).

Where precoding is used, one may show that on average the total transmit power used by the first transmitter 10 for transmitting the transmit diversity combinations (Eq. (16) and Eq. (17)) is close to one for both symbol periods. The channel capacity in this case may be estimated as $$\text{Capacity} = \frac{1}{2}\log_2\left(1 + \frac{\max\{(|c|^2 - 1/2|d|^2)(1+\cos\theta), 0\}}{N_o}\right) \qquad \text{Eq. (28)}$$

Comparison of the capacity expression given in Eq. (28) with the one given in Eq. (15) demonstrates that use of precoding yields improved channel capacity at the expense of slightly more complicated transmit diversity based interference cancellation and reception operations.

Figure 7:
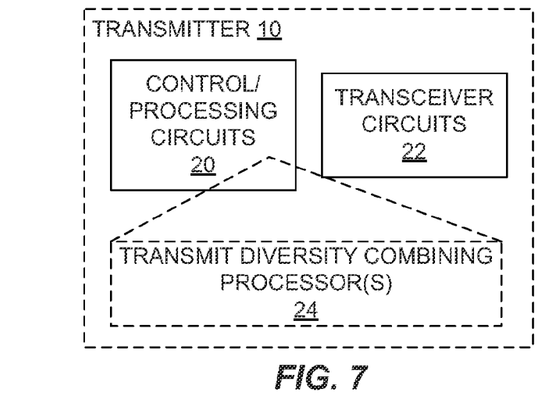
FIG. 7 is a block diagram for one embodiment of a transmitter configured for transmit diversity based interference cancellation.
Figure 8:
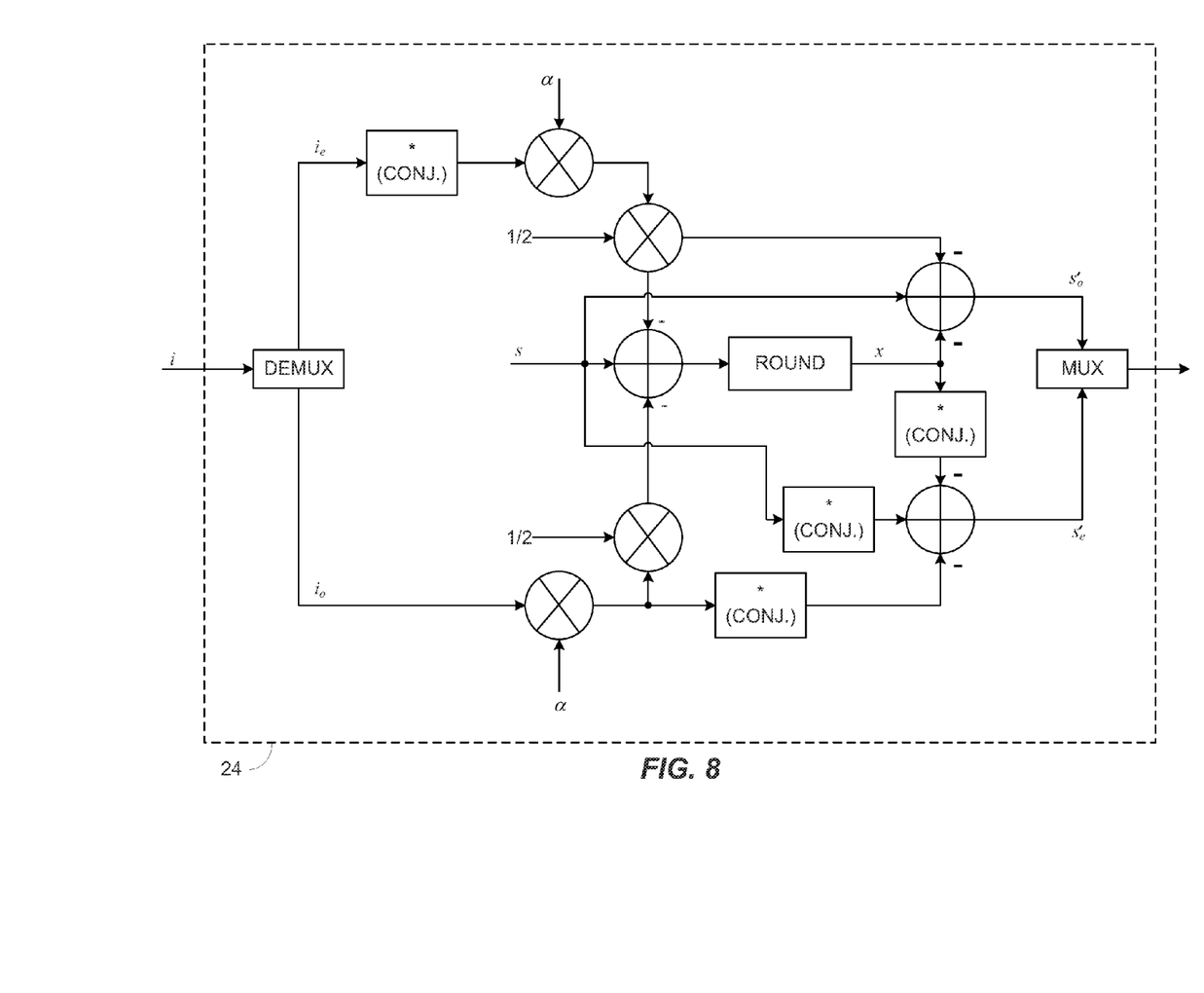
FIG. 8 is a corresponding block diagram for processor details in an embodiment of the transmitter that uses precoding values in its transmit diversity based interference cancellation.
Figure 10:
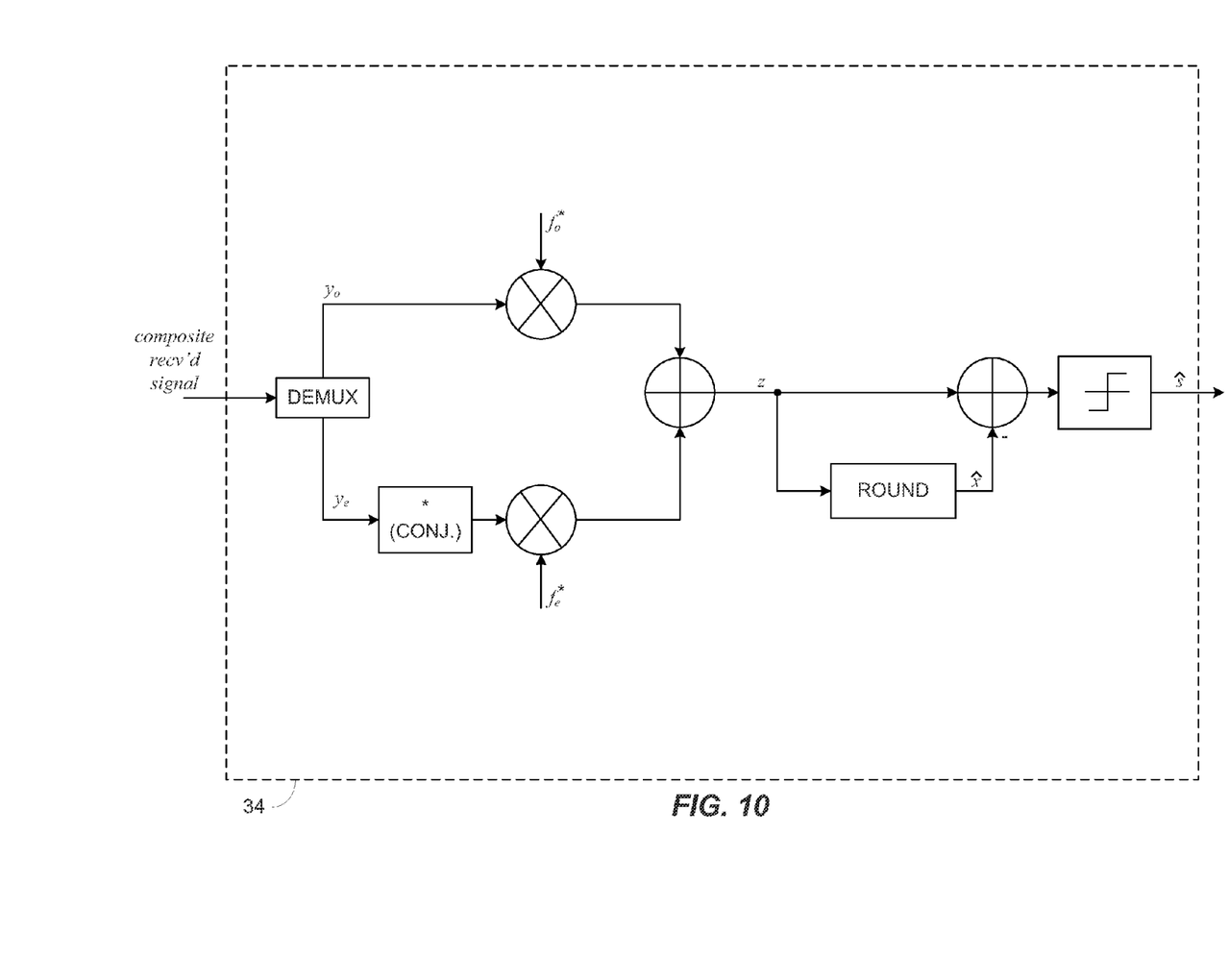
FIG. 10 is a corresponding block diagram for processor details in an embodiment of the receiver configured for operation with precoding values.

With the above processing in mind, FIG. 7 illustrates an embodiment of the first transmitter 10 comprising control/processing circuits 20 for carrying out communication and control processing, transceiver circuit 22 for wireless transmitting to and receiving from the targeted transmitter 12, and one or more processors 24, which may be part of the control/processing circuits 20, and which are configured for one or more embodiments of transmit diversity based interference cancellation as taught herein. Correspondingly, FIG. 8 at least partially illustrates the processor(s) 24 for an embodiment that makes use of the precoding value x as part of forming and transmitting the transmit diversity combinations described herein. Note that the subscripts "o" and "e" used in FIG. 8 (and in FIG. 10) refer to odd and even time indices, respectively. This more generic referencing corresponds to the first and second time periods also referred to herein using the "1" and "2" subscripts. Further, note that the "ROUND" operations illustrated in FIGS. 8 and 10 refer to the rounding operations detailed in Eq. (25) and Eq. (26).

Figure 9:
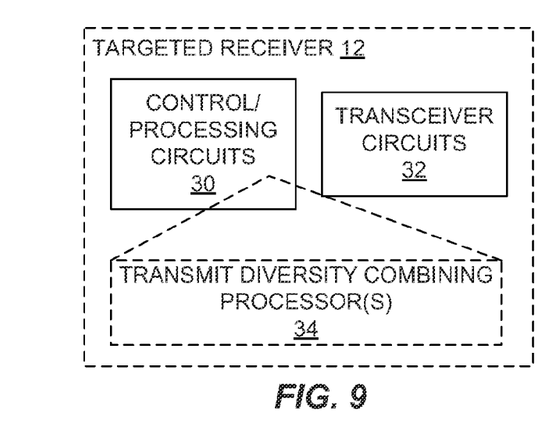
FIG. 9 is a block diagram for one embodiment of a receiver configured for transmit diversity combining as a complement to corresponding transmit diversity based interference cancellation at its supporting transmitter.

Similarly, FIG. 9 illustrates an embodiment of the targeted receiver 12 comprising control/processing circuits 30 for carrying out communication and control processing, transceiver circuit 32 for wireless transmitting to and receiving from the first transmitter 10, and one or more processors 34, which may be part of the control/processing circuits 30, and which are configured for one or more embodiments of transmit diversity combining as taught herein. Correspondingly, FIG. 10 at least partially illustrates the processor(s) 34 for an embodiment that makes use of the precoding value x as part of forming the received signals for transmit diversity combining described herein.

Given the programmability and/or configurability of the processors in the first transmitter 10 and the targeted receiver 12, it will be understood that transmit diversity based interference cancellation may be practiced according to essentially any number of desired variations. For example, it may be noted that transmit diversity based interference cancellation may not be desirable or possible where the instantaneous SIR at the targeted receiver 12 is less than −3 dB. In general, those skilled in the art will appreciate that dynamically changing reception conditions at the targeted receiver 12 will influence whether transmit diversity based interference cancellation does or does not yield a performance advantage. The alternative simply is for the first transmitter 10 to transmit the desired symbols (e.g., $s_{11}$, $s_{12}$, $S_{13}$, $s_{14}$, and so on) to the targeted receiver 12 at the same rate as the second transmitter 14 transmits the interfering symbols (e.g., $s_{21}$, $s_{22}$, $s_{23}$, $s_{24}$, and so on).

From the earlier presentation, channel capacity for the link between the first transmitter 10 and the targeted receiver 12 can be estimated according to Eq. (15) if the precoding value x is not used, or according to Eq. (28) if the precoding value x is used. In contrast, for times when transmit diversity based interference cancellation is inactive, the channel capacity may be estimated as, $$\text{Capacity} = \log_2\left(1 + \frac{|c|^2}{|d|^2 + N_o}\right) \quad \text{Eq. (29)}$$

Thus, the transmit diversity based interference cancellation method taught herein contemplates embodiments where transmit diversity based interference cancellation is selectively performed, in dependence on whether its use would yield a capacity improvement as compared to operation without transmit diversity based interference cancellation. One example would be using transmit diversity based interference cancellation when the targeted receiver 12 is in the presence of strong interference from the second transmitter 14, and not using transmit diversity based interference cancellation when the targeted receiver is only weakly influenced by transmissions from the second transmitter 14.

In general, the selective use of transmit diversity based interference cancellation may be understood as an "adaptive" scheme whose achievable capacity is given as, $$\text{Capacity}_{adaptive} = \max\{C_{w/TDC}, C_{w/oTDC}\} \quad \text{Eq. (30)}$$

where w/TDIC denotes that transmit diversity based interference cancellation is active (operation with transmit diversity based interference cancellation) and w/o TDIC denotes that transmit diversity based interference cancellation is inactive (operation without transmit diversity based interference cancellation).

Figure 11:
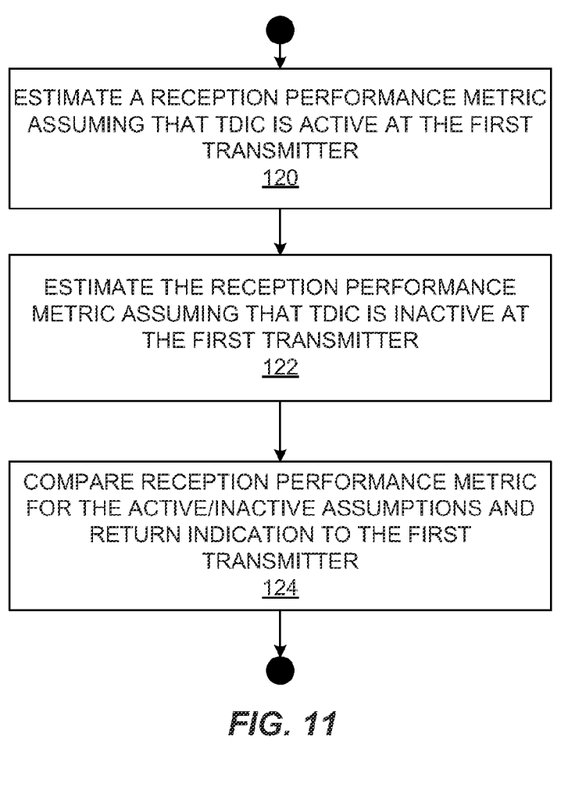
FIG. 11 is a logic flow diagram for one embodiment of processing logic, such as can be performed at a targeted receiver, for determining whether operating with transmit diversity combining yields a reception performance advantage as compared to operating without it.

With the above adaptive operation in mind, FIG. 11 illustrates processing that may be performed, e.g., at the targeted receiver 12, as a basis for determining whether to transmit desired symbols to the targeted transmitter 12 with or without the use of transmit diversity based interference cancellation. Processing begins with estimating a reception performance metric assuming that transmit diversity based interference cancellation is active at the first transmitter 10 (e.g., a capacity estimation according to Eq. (15) or Eq. (28)) (Step 120). Processing continues with the estimation of the same performance metric but with the assumption that transmit diversity based interference cancellation is not active at the first transmitter 10 (e.g., a capacity estimation according to Eq. (29)) (Step 122). Processing continues with a comparison of the performance metric as determined for operation with transmit diversity based interference cancellation and as determined for operation without transmit diversity based interference cancellation (e.g., a comparison of $C_{w/TDC}$ and $C_{w/oTDC}$) (Step 124). This comparison is used to generate a corresponding indication of whether or not transmit diversity based interference cancellation should be used.

Figure 12:
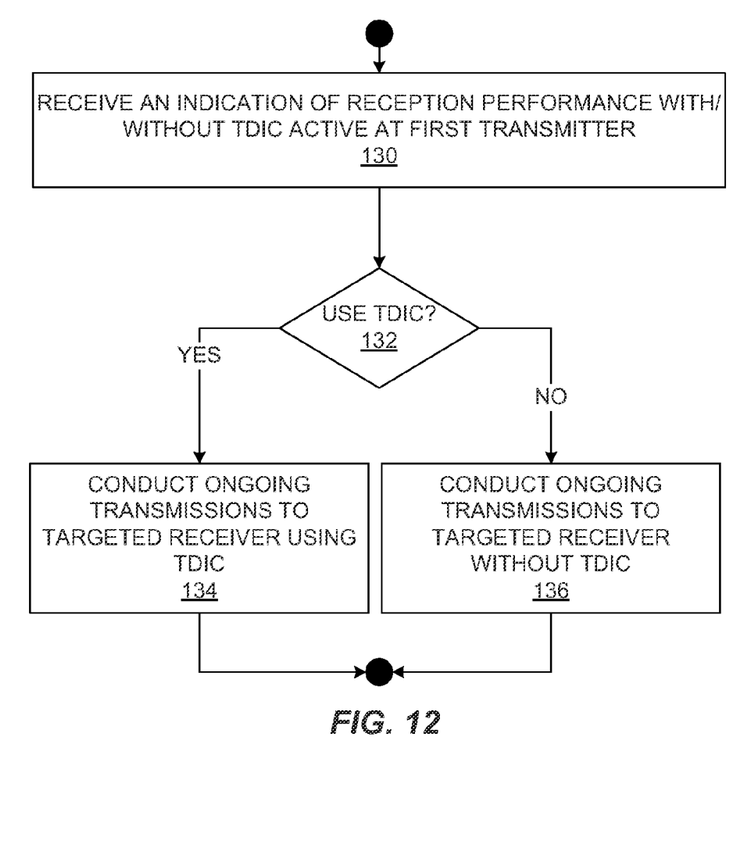
FIG. 12 is a logic flow diagram for one embodiment of selectively activating and deactivating transmit diversity based interference cancellation at a transmitter in response to an indication of whether transmit diversity based interference cancellation is desirable for current reception conditions.

The processor(s) 34 in the targeted receiver 12 can be configured to carry out the above performance comparisons, e.g., periodically or as ongoing background processing, and to send corresponding indications to the first transmitter 10. Complementing that operation, FIG. 12 illustrates processing logic that may be implemented at the first transmitter 10 as a basis for selectively activating and de-activating transmit diversity based interference cancellation.

The illustrated processing begins with the first transmitter 10 receiving an indication of reception performance with and without transmit diversity based interference cancellation active at the first transmitter 10. For example, a simple flag (e.g., a bit indicator) may be provided to the first transmitter 10 that indicates whether to activate or de-activate transmit diversity based interference cancellation (Step 130). Thus, processing continues with the first transmitter 10 evaluating the indication (Step 132). If the evaluation indicates that transmit diversity based interference cancellation is desired, processing continues with activating transmit diversity based interference cancellation (or allowing it to remain active) (Step 134). Conversely, if the evaluation indicates that transmit diversity based interference cancellation is not desired, processing continues with deactivating transmit diversity based interference cancellation (or allowing it to remain inactive) (Step 136).

It will be appreciated that the activation/de-activation decision can be made at a desired rate, and that the indication of transmit diversity based interference cancellation desirability can be generated or otherwise updated at the desired rate. As another point, it should be understood that the determination of the performance metric assuming operation with transmit diversity based interference cancellation and assuming operation without transmit diversity based interference cancellation may be more involved, such as where the decision to use or not use transmit diversity based interference cancellation must be made for a given range of sub-carrier frequencies or for a given range of symbol periods.

For example, selectively operating the transmit diversity based interference cancellation method at the first transmitter 10 as a function of dynamically changing reception conditions at the targeted receiver 12 comprises, for a given plurality of OFDM sub-carriers, determining whether to operate with or without the transmit diversity based interference cancellation method at the first transmitter 10 based on determining a reception performance metric averaged over the plurality of OFDM sub-carriers transmitted by the first transmitter 10 assuming that transmit diversity based interference cancellation is active and assuming that transmit diversity based interference cancellation is inactive. That is, because of frequency selectivity over the range of OFDM sub-carriers, individual channel capacities can be calculated for each sub-carrier (assuming operation with transmit diversity based interference cancellation and assuming operation without transmit diversity based interference cancellation). The individual channel capacities (with and without transmit diversity based interference cancellation) can be summed over the entire subset of OFDM sub-carriers of interest, and average channel capacities thereby determined for comparison. A similar approach can be used for a range of symbol periods.

Whether or not averaging is used for performance metric estimation, it will be appreciated that transmit diversity based interference cancellation is made responsive to updates in channel gain estimation. That is, the scaling values, e.g., α, used in transmit diversity based interference cancellation is updated as needed in response to updates in c and d, which are, respectively, the channel gains between the first transmitter 10 and the targeted receiver 12, and between the second transmitter 14 and the targeted receiver 12.

It can be appreciated that the receive filter given by Eq. (10) (or Eq. (23) if precoding is employed) is designed to cancel interference completely regardless of the noise and the relative channel phase θ. In some scenarios noise may be a dominant impairment while in other scenarios the relative channel phase may be such that canceling interference also results in canceling the desired signal. In such scenarios, the receive filter that attempts to cancel interference is far from optimal. An optimal filter minimizes the MSE (mean square error). It can be shown that the MMSE (minimum MSE) at the receiver in the precoding case is given by $$MMSE = \frac{[(\alpha|c| + |d|)^2 + N_0][(\alpha|c| - |d|)^2 + N_0]}{[(\alpha|c| + |d|)^2 + N_0][(\alpha|c| - |d|)^2 + N_0] + 2\left(1 - \frac{\alpha^2}{2}\right)|c|^2[|\alpha c + d|^2 + N_0]} \quad \text{Eq. (31)}$$

A minimum mean square error (MMSE) receive filter for the precoding case can be expressed as $$f'_{MMSE} = \frac{\sqrt{1 - \frac{\alpha^2}{2}}}{[(\alpha|c| + |d|)^2 + N_0][(\alpha|c| - |d|)^2 + N_0] + 2\left(1 - \frac{\alpha^2}{2}\right)|c|^2[|\alpha c + d|^2 + N_0]} \begin{bmatrix} c(\alpha^2|c|^2 + |d|^2 + 2\alpha c^*d + N_0) \\ c^*(\alpha^2|c|^2 + |d|^2 + 2\alpha c d^* + N_0) \end{bmatrix} \quad \text{Eq. (32)}$$

where $\alpha^2 < 2$ in Eq. (31) and Eq. (32). The channel capacity corresponding to Eq. (31) is given by $$C = \frac{1}{2}\log_2\left(1 + \frac{2\left(1 - \frac{\alpha^2}{2}\right)|c|^2[|\alpha c + d|^2 + N_0]}{[(\alpha|c| + |d|)^2 + N_0][(\alpha|c| - |d|)^2 + N_0]}\right) \quad \text{Eq. (33)}$$

Note that for α as given by Eq. (7), the above expression for capacity reduces to $$C = \frac{1}{2}\log_2\left(1 + \max\left(\left(|c|^2 - \frac{1}{2}|d|^2\right)\left(\frac{1+\cos\theta}{N_0} + \frac{1-\cos\theta}{N_0 + 4|d|^2}\right), 0\right)\right) \quad \text{Eq. (34)}$$

It can be appreciated that the scale factor α has been chosen to allow complete interference cancellation at the receiver. Alternatively, the scale factor can be selected to minimize the MSE at the receiver. However, since the MMSE as given by Eq. (31) depends on the relative phase θ, such a scale factor depends on the relative phase. To avoid feedback of the relative phase information to the transmitter, one may design the scale factor to minimize the average MSE, i.e. MSE averaged over all possible values of the relative phase. The receive filter in this case can still be based on minimizing MSE as described above.

Of course, the targeted receiver 12 may be configured to compute at least the scaling factor α, whether based on minimizing the MSE or the average MSE, and return the computed value of the scaling factor(s) to be used by the first transmitter 10 as scaling information feedback. In this manner, the first transmitter 10 can apply scaling values as received from or updated by feedback from the targeted receiver 12. More generally, the first transmitter 10 receives scaling information to the targeted receiver 12, which may comprise actual scaling values to be used in scaling the desired and interfering symbols in the transmit diversity combinations transmitted by the first transmitter 10, or information from which the first transmitter 10 can determine appropriate scaling values. Such information may, as explained, comprise reception condition feedback for the targeted receiver, e.g., channel model information indicating, for example, a ratio of the first and second channel gains.

In at least one embodiment, the reception condition feedback includes additional reception information comprising at least one of relative channel phase information relating the targeted receiver 12 to the first and second transmitters 10 and 14, and noise variance information indicating received signal noise variance at the targeted receiver 12, such that the scaling values are determined (by the first transmitter 10) as a function of the ratio of the first and second channel gains and the additional reception information. This allows, for example, optimum determination of the scaling values for MSE minimization at the targeted receiver 12. That is, the α and β scaling values may be based on ratios of channel gains relating the targeted receiver 12 to the first transmitter and to the second transmitter 14, and/or based on relative channel phase information relating the targeted receiver 12 to the first transmitter 10 and to the second transmitter 14, and/or based on noise variance for the received signal at the targeted receiver 12. Preferably, the scaling values consider the ratio of channel gains, and optionally consider relative channel phase and/or received signal noise variance.

It also should be appreciated that the foregoing discussion used one interfering transmitter 14 as an example for ease of discussion. That is, transmit diversity based interference cancellation as taught herein can be applied to any number of interfering transmitters. For example, for any number of additional interfering transmitters, the first transmitter 10 may be configured to transmit additional known interfering first and second symbols as part of the transmit diversity combinations. To that end, the first transmitter 10 receives additional scaling information related to the targeted receiver 12. The additional scaling information may comprise, for example, channel gain feedback indicating additional channel gains respectively relating the targeted receiver 12 to the additional interfering transmitters, and/or may comprise additional relative channel phase information.

With the additional scaling information, the first transmitter 10 determines corresponding scaling values as needed, and forms the first transmit diversity combination additionally to include conjugates of the additional second interfering symbols scaled by their corresponding scaling values, and forms the second transmit diversity combination additionally to include conjugates of the additional first interfering symbols scaled by their corresponding scaling values. For example, consider two interferers whose symbols $i_n(1)$ and $i_n(2)$ are known at the desired user transmitter. In this case, the transmitter can transmit the signal $s'_1 = \tilde{\beta}s - \tilde{\alpha}(i_2(1) + i_2(2))$ in the first symbol period and the signal $s'_2 = \tilde{\beta}s^* - \tilde{\alpha}(i^*_1(1) + i^*_1(2))$ in the second symbol period, where $\tilde{\alpha}$ and $\tilde{\beta}$ are scaling values. Letting d(1) and d(2) be the channel responses for the two interferers, the received signal vector (for the first two symbol periods) is given by $$\underline{y} = \begin{bmatrix} y_1 \\ y_2^* \end{bmatrix} = \begin{bmatrix} c \\ c^* \end{bmatrix}\tilde{\beta}s + \begin{bmatrix} d(1)+d(2) & -\tilde{\alpha}c \\ -\tilde{\alpha}c^* & d(1)^* + d(2)^* \end{bmatrix}\begin{bmatrix} i_1(1) + i_1(2) \\ i_2^*(1) + i_2^*(2) \end{bmatrix} + \begin{bmatrix} w_1 \\ w_2^* \end{bmatrix} \quad \text{Eq. (35)}$$

In order to cancel interference arising from both interferers, the scaling factor $\tilde{\alpha}$ can be chosen as $$\tilde{\alpha} = \sqrt{\frac{|d(1)+d(2)|^2}{|c|^2}} \quad \text{Eq. (36)}$$

and the scaling factor $\tilde{\beta}$ can be chosen as $$\tilde{\beta}=\sqrt{1-\tilde{\alpha}^2} \quad \text{Eq. (37)}$$

While one or more of the foregoing examples were described for single transmit and receive antennas, it will be apparent to those skilled in the art that the teachings presented herein can be readily modified for use in the case of multiple transmit and receive antennas. With this and other variations in mind, those skilled in the art will appreciate that the foregoing description and the accompanying drawings represent non-limiting examples of the methods and apparatus taught herein for transmit diversity based interference cancellation. As such, the present invention is not limited by the foregoing description and accompanying drawings. Instead, the present invention is limited only by the following claims and their legal equivalents.

What is claimed is:

1. A method of supporting transmit diversity based interference cancellation in a receiver, the method comprising:
   determining a filter as a function of first and second channel models respectively relating the receiver to a first transmitter transmitting a transmit diversity combination signal to the receiver having desired and interfering symbol information, and relating the receiver to a second transmitter transmitting an interfering signal having the interfering symbol information; and
   detecting desired symbol information by applying the filter to a received signal formed as a first received signal corresponding to a first symbol period or sub-carrier in which the first transmitter transmitted a first transmit diversity combination signal formed from a first desired symbol and a second interfering symbol and the second transmitter transmitted a first interfering symbol, and as a second received signal corresponding to a second symbol period or sub-carrier in which the first transmitter transmitted a second transmit diversity combination signal formed from the first desired symbol and the first interfering symbol and the second transmitter transmitted the second interfering symbol.

2. For a targeted receiver, a method of supporting transmit diversity based interference cancellation by a first transmitter, the method comprising:
   determining first and second channel models respectively relating the targeted receiver to the first transmitter and to a second transmitter transmitting interfering symbols known to the first transmitter;
   determining scaling information as a function of the first and second channel models and sending the scaling information to the first transmitter to support transmit diversity based interference cancellation by the first transmitter;
   determining a filter as a function of the first and second channel models;
   receiving a first received signal in a first symbol period or sub-carrier and receiving a second received signal in a second symbol period or sub-carrier;
   said first received signal corresponding to transmission from the first transmitter of a first desired symbol and a second interfering symbol, both such symbols scaled according to the scaling information, and transmission from the second transmitter of a first interfering symbol;
   said second received signal corresponding to transmission from the first transmitter of the first desired symbol and the first interfering symbol, both such symbols scaled according to the scaling information, and transmission from the second transmitter of the second interfering symbol; and
   forming a diversity combination of the first and second received signal based on the filter, to thereby cancel interference attributable to the first and second interfering symbols.

3. The method of claim 2, further comprising determining updated first and second channel models and sending corresponding updated scaling information to the first transmitter.

4. The method of claim 2, further comprising determining a performance metric indicating whether the first transmitter should or should not use transmit diversity based interference cancellation, and sending an indication of the performance metric to the first transmitter.

5. The method of claim 2, wherein determining a performance metric indicating whether the first transmitter should or should not use transmit diversity based interference cancellation comprising determining a reception performance metric averaged over a plurality of Orthogonal Frequency Division Multiplexing (OFDM) sub-carriers transmitted by the first transmitter for a first case that assumes transmit diversity based interference cancellation is active and for a second case that assumes transmit diversity based interference cancellation is inactive, and comparing the reception performance metric for the two assumptions.

6. A receiver circuit comprising one or more processors configured to:
   determine first and second channel models respectively relating a targeted receiver that includes the receiver circuit to first and second transmitters;
   determine scaling information as a function of the first and second channel models and send the scaling information to the first transmitter to support transmit diversity based interference cancellation by the first transmitter;
   determine a filter as a function of the first and second channel models;
   receive a first received signal in a first symbol period or sub-carrier and receiving a second received signal in a second symbol period or sub-carrier;
   said first received signal corresponding to transmission from the first transmitter of a first desired symbol and a second interfering symbol, both such symbols scaled according to the scaling information, and transmission from the second transmitter of a first interfering symbol;
   said second received signal corresponding to transmission from the first transmitter of the first desired symbol and the first interfering symbol, both such symbols scaled according to the scaling information, and transmission from the second transmitter of the second interfering symbol; and
   form a diversity combination of the first and second received signals based on the filter, to thereby cancel interference attributable to the first and second interfering symbols.

7. The receiver circuit of claim 6, wherein the one or more processors are configured to determine updated first and second channel models and send corresponding updated scaling information to the first transmitter.

8. The receiver circuit of claim 6, wherein the one or more processing circuits are configured to determine a performance metric indicating whether the first transmitter should or should not use transmit diversity based interference cancellation, and to send an indication of the performance metric to the first transmitter.

* * * * *

UNITED STATES PATENT AND TRADEMARK OFFICE
CERTIFICATE OF CORRECTION

| | | |
|---|---|---|
| PATENT NO. | : 8,265,213 B2 | Page 1 of 1 |
| APPLICATION NO. | : 13/158936 | |
| DATED | : September 11, 2012 | |
| INVENTOR(S) | : Hafeez | |

It is certified that error appears in the above-identified patent and that said Letters Patent is hereby corrected as shown below:

In Column 4, Line 43, delete "$S_{12}$," and insert -- $s_{12}$, --, therefor.

In Column 8, Line 3, delete "βs*$_{12}$αs*$_{23}$." and insert -- $\beta s^*_{12} - \alpha s^*_{23}$. --, therefor.

In Column 9, Line 44, delete "$N_O$" and insert -- $N_0$ --, therefor.

In Column 10, Lines 12-13, in Eq. (14), delete "$\frac{|c|^2 - |d|^2}{N^O}$" and insert -- $\frac{|c|^2 - |d|^2}{N_0}$ --, therefor.

In Column 10, Line 23, in Eq. (15), delete "$N_O$" and insert -- $N_0$ --, therefor.

In Column 11, Line 59, in Eq. (27), delete "$\hat{z} = \hat{z}' + \hat{x}$" and insert -- $\hat{z} = z' + \hat{x}$ --, therefor.

In Column 13, Line 35, in Eq. (30), delete "=max{$C_{w/TDC}$, $C_{w/oTDC}$}" and insert -- =max{$C_{w/TDIC}$, $C_{w/oTDIC}$} --, therefor.

In Column 13, Line 59, delete "$C_{w/TDC}$ and $C_{w/oTDC}$)" and insert -- $C_{w/TDIC}$ and $C_{w/oTDIC}$) --, therefor.

Signed and Sealed this
Twelfth Day of February, 2013

Teresa Stanek Rea
*Acting Director of the United States Patent and Trademark Office*